United States Patent [19]

Kuhr

[11] 4,257,205
[45] Mar. 24, 1981

[54] ATTACHMENT SYSTEM FOR SUSPENDED DRYWALL CEILING PANELS

[75] Inventor: Albert F. Kuhr, Elk Grove Village, Ill.

[73] Assignee: United States Gypsum Company, Chicago, Ill.

[21] Appl. No.: 57,920

[22] Filed: Jul. 16, 1979

[51] Int. Cl.³ .......................... E04B 5/52; E04B 1/40
[52] U.S. Cl. ...................................... 52/484; 403/191
[58] Field of Search ............... 52/665, 488, 484, 713, 52/489; 403/217, 241, 230, 232.1, 191

[56] References Cited

U.S. PATENT DOCUMENTS

| | | | |
|---|---|---|---|
| 3,037,594 | 6/1962 | Kaufman | 52/484 |
| 3,612,461 | 10/1971 | Brown | 52/484 |
| 3,677,589 | 7/1972 | Roles | 52/665 |
| 3,785,110 | 1/1974 | Galloway | 52/665 |

Primary Examiner—John E. Murtagh
Attorney, Agent, or Firm—Glenn W. Ohlson; Samuel Kurlandsky; Robert H. Robinson

[57] ABSTRACT

An attachment system for suspended drywall ceiling panels is disclosed. The attachment system comprises a panel support grid having a series of main-runners and cross-runners disposed with lower panel attachment surfaces in generally co-planar relationship and said grid having intersection points at main-runner and cross-runner crossings. The attachment system has attachment clips positioned at said intersection points interconnecting cross-runners and main-runners. The attachment clips being integrally constructed from light-gauge steel and having a box-like configuration with two opposing vertical walls and opposing upper and lower horizontal walls wherein the upper wall centrally separates into halves. The upper wall halves include upwardly extending tabs with tab connecting means releasably connectiing both halves. The opposing vertical walls of the attachment clip each having an oppositely extending cross-runner attachment flange. Said clips engaged in a sleeve-like manner to said main-runners by means of the box-like configuration separating at said upper wall to extend around outer portions of main-runners. A spacer key is struck out from the lower wall of the attachment clip and extends downwardly in a plane generally parallel with the longitudinal axis of the main-runner. The attachment system further comprises ceiling panels comprised of gypsum and being mechanically fastened to said lower panel attachment surfaces wherein adjacent panels meet at butt joints along cross-runners and spaced-apart open joints along main-runners being spaced apart by said spacer keys of the attachment clips.

23 Claims, 12 Drawing Figures

ATTACHMENT SYSTEM FOR SUSPENDED DRYWALL CEILING PANELS

BACKGROUND OF THE INVENTION

1. Field of the Invention

This invention relates to an attachment system for suspended drywall ceiling panels.

2. Description of the Prior Art

Many present suspended ceiling system designs are widely used in the building construction industry. It has been consistently desirable to reduce installation time by utilizing a reduced number of components for drywall ceiling panel attachment. Although many past attempts have individually solved problems of fire resistancy, adaptability for attachment to diverse upper support framing and quick installation, none has sufficiently provided a system that solves all these problems while retaining simplified design.

Previous systems involve basic standard exposed grid systems with enlarged lower flanges to accept screw fasteners. Other variations provide differently shaped inverted-T cross-members and main-runners. While these attempts do simplify installation they are unable to accept recessed lighting fixtures and air distribution bars without the aid of supplemental trims or clips. They also fail to compensate for misaligned panels, or panel runout, particularly in large areas where supplemental support members have to be added. These additions significantly increase the overall system cost. Other shortcomings of these previous attempts are their inability to provide for soffit or non-planar ceiling constructions. Thereby, difficulty in screw fastening to grid members occurs because of the design and size of mating flanges and the lack of rigid mounting provision necessary to eliminate ceiling uplift where required.

Typically, inverted-T runners, or channel-shaped runners are predominant conformations in the prior art. To provide for varieties of air handling and lighting accessories, additional components have been required along with alteration of conventional runner members. As additional components are required, fire ratings become more difficult to attain and manufacturing costs escalate.

Additionally, with the advent of the do-it-yourself consumer, who performs numerous types of repair and remodeling tasks, simplified installation has become a key goal in the industry. The ability of a system to provide variable location capability for many particular consumer residential uses has become necessitated as room limitations and requirements widely vary.

3. Objects of the Invention

It is a primary object of this invention to provide an attachment system for suspended drywall ceiling panels which involves simplified components facilitating ease of installation and having lowered costs.

It is also an important object of this invention to provide a fire resistant attachment system.

It is accordingly an object of this invention to provide a grid-like runner system having simplified interconnection between cross-runners and main-runners and adaptable means for attachment to upper support members.

It is an attendant object of this invention to provide an attachment system for suspended drywall ceiling systems adaptable with self-leveling or rigid hanger attachment to upper support members.

It is a concomitant goal of this invention to provide a facile attachment system for conventional gypsum ceiling panels by utilizing well-known self-drilling drywall screws.

It is also an object of this invention to provide an attachment system for suspended drywall ceiling panels featuring typical square-edged gypsum panels obviating the need for special edge configurations.

An allied goal of the invention is to afford simplified installation with a reduced number of components for both the do-it-yourself residential consumer and the skilled tradesman.

SUMMARY OF THE INVENTION

The objects of this invention are accomplished by an attachment system for suspended drywall ceiling panels comprising a panel support grid having a series of main-runners and cross-runners disposed with lower panel attachment surfaces in generally co-planar relationship wherein cross-runners extend between main-runners in lengths defined by main-runner spacing intervals and wherein the grid has intersection points at main-runner and cross-runner crossings. The objects are further retained by said attachment system having attachment clips positioned at the intersection points interconnecting cross-runners and main-runners wherein the attachment clips are integrally constructed from light-gauge steel and have a box-like configuration with two opposing vertical walls and opposing upper and lower horizontal walls. The upper wall of the attachment clip centrally separates into halves along a line parallel to the main-runner and said halves include upwardly extending tabs with tab connecting means releasably connecting both halves of the upper wall. The tabs have apertures therethrough facilitating attachment to upper support means. The opposite vertical walls each have an oppositely extending cross-runner attachment flange extending from vertical edges at the same side of the clip. The attachment flanges connect cross-runners at opposite sides of the main-runner whereby said clip is engaged in a sleeve-like manner to said main-runner by means of said box-like configuration separating at said upper wall to extend around outer portions of the main-runner. The attachment system is further provided with said clip having an alignment tongue struck out from one opposing side wall extending inwardly of said box-like configuration and also having a positioning slot at the side wall opposite the alignment tongue. The bottom wall of the attachment clip has a panel spacer key struck out from the lower wall extending downwardly in a plane generally parallel with the longitudinal axis of the main-runner. The attachment system also has ceiling panels comprised of gypsum which are mechanically fastened to the panel attachment surfaces whereby adjacent panels meet at butt joints along cross-runners and are spaced apart at open joints along said main-runner by the spacer keys of the attachment clips.

A BRIEF DESCRIPTION OF THE DRAWINGS

This invention may be more fully described and defined by the embodiments shown in the attached drawings wherein.

DESCRIPTION OF THE PREFERRED EMBODIMENTS

Figure 1:
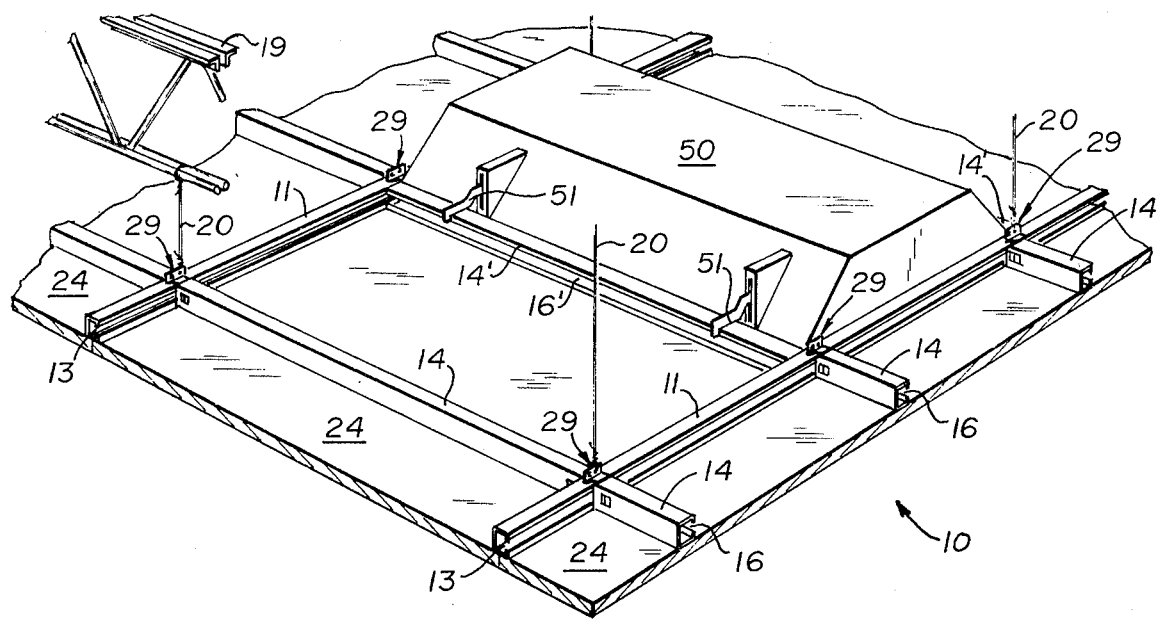
FIG. 1 is a perspective view looking downward at a portion of the attachment system for suspended drywall ceiling panels in accordance with the preferred embodiment of the invention.

The attachment system for suspended drywall ceiling panels of this invention is more fully described by reference to the embodiments illustrated in the attached drawings wherein FIG. 1 depicts the attachment system for suspended drywall ceiling panels of this invention looking downward at attachment system 10 in a perspective view showing a portion thereof. In a grid-like fashion attachment system 10 has main-runners 11 and cross-runners 14 disposed at right angles thereto. Main-runners 11 are substantially parallel and are spaced at about four feet center-to-center. Similarly cross-runners 14 are in parallel alignment and are spaced apart preferably at two feet center-to-center. Within the scope of the invention spacings of main-runners 11 and cross-runners 14 may vary according to individual support requirements whereby main-runners 11 can be spaced at from about two feet to about six feet center-to-center and cross-runners 14 spaced at from about sixteen inches to about 48 inches center-to-center. In the preferred embodiment both main-runners 11 and cross-runners 14 comprise channels having a substantially identical C-shaped cross-section. Openings 13 of the C-shape of main-runners 11 are disposed opening sidewardly in the same direction. Openings 16 of the C-shape of cross-runners 14 open sidewardly in the same direction except, as shown for cross-runners 14', disposed with openings 16' in the opposite direction facilitating a later-described affixation of light troffer assembly 50. At the crossings, or grid intersection points, cross-runners 14 are interconnected and attached to main-runners 11 by means of attachment clip 29. Supporting attachment system 10 to upper framing 19 are conventional hanger wires 20. Hanger wires 20 are desirably attached to alternate attachment clips 29 in a direction along main-runners 11, thus occurring at four-foot intervals. Within the spirit of the invention other supportive arrangements may be provided such as attaching all attachment clips 29 with hanger wires 20 to upper framing 19. Other variations will be clear to those skilled in the construction industry. Attachment system 10 provides a ceiling surface for a room, or the like, below and has ceiling panels 24 supported by the main-runners 11 and cross-runners 14. In the preferred embodiment ceiling panels 24 comprise a fire resistant gypsum composition widely used in the drywall ceiling construction industry, but other well-known gypsum compositions may be used. It is desirable that ceiling panels 24 be provided in conventional rectangular configurations having shorter sides, widths, of from about two feet to about six feet and longer sides, lengths, in the range of from about four feet to about twelve feet. It is envisioned that typical thicknesses for ceiling panels 24 be provided and in the preferred embodiment $\frac{5}{8}$ inch fire resistant gypsum ceiling panels 24 are provided. Within the scope of the invention thickness in the range of from about $\frac{3}{8}$ inch to about 1 inch may be provided for the thickness of ceiling panels 24. Additionally, a laminated ceiling surface may be provided by laminating two thicknesses of panels when additional fire resistancy, sound reduction, or other properties are sought.

Figure 2:
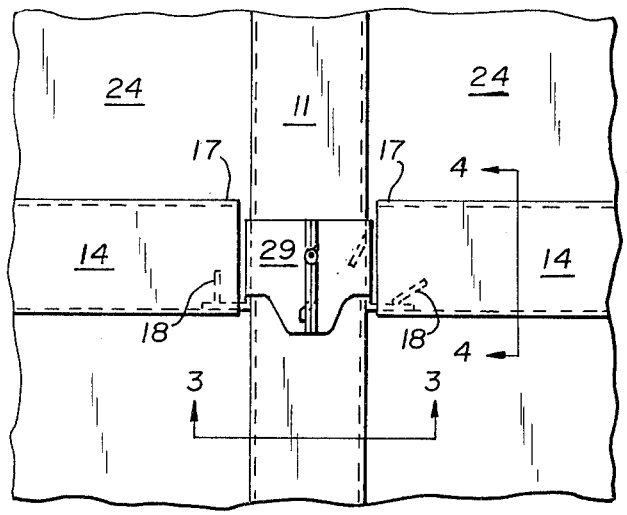
FIG. 2 is a plan view of a typical grid intersection point at the crossing of cross-runners with a main-runner in accordance with this invention.

With reference to FIG. 2, a typical grid intersection point for attachment system 10 in accordance with this invention is illustrated and comprises main-runner 11 intersected by cross-runners 14 at either side being disposed at right angles thereto. Attachment clip 29 is illustrated showing affixation with cross-runners 14 and being attached around main-runner 11. Attachment of cross-runners 14 to attachment clip 29 is obtained by means of connection with flaps 18 extending from terminal end portions 17 of cross-runners 14. The termini 17 represent the general end segments of the lengths of cross-runners 14 and flaps 18 are struck inward of the C-shape from the web portion of the generally C-shape of cross-runner 14.

Figure 3:
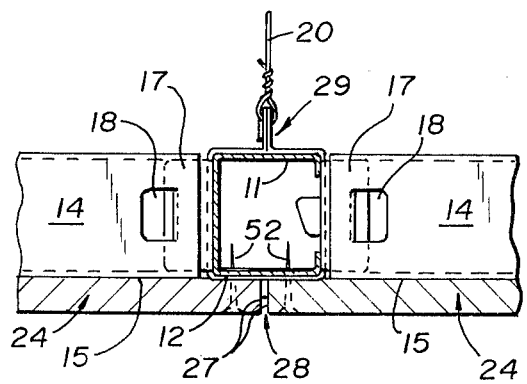
FIG. 3 is a cross-sectional view taken along line 3—3 of FIG. 2 looking in the direction of the arrows.

With reference to FIGS. 2 and 3, FIG. 3 illustrates a cross-section of FIG. 2 taken along lines 3—3 looking in the direction of the arrows. Cross-runners 14 are shown having flaps 18 engaged with attachment clip 29 for supportive engagement thereby. Main-runner 11 has lower attachment surface 12 and cross-runners 14 have lower attachment surfaces 15 for affixation of ceiling panel 24 below. Lower attachment surfaces 12 and 15 reside generally co-planar to provide level attachment surfaces for ceiling panels 24. As shown, conventional hanger wire 20 is provided for support of the runner members. Conventional bugle-head self-drilling drywall screws 52 are shown for the preferred manner of affixation whereby they penetrate ceiling panels 24 and extend through the lower attachment surface 12 of main-runner 11. Longer edges 27 of ceiling panels 24 are disposed generally parallel below and along main-runners 11, and an open joint 28 is provided along main-runners 11 by means of later-described spacer key 49 of attachment clip 29.

Figure 4:
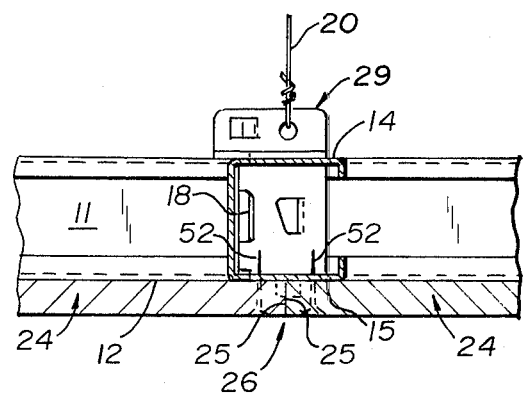
FIG. 4 is a cross-sectional view taken along line 4—4 of FIG. 2 looking in the direction of the arrows.

With reference to FIGS. 2 and 4, FIG. 4 illustrates a cross-section taken along line 4—4 of FIG. 2 looking in the direction of arrows. A side view of main-runner 11 is thereby depicted and cross-runner 14 is shown in cross-section having said C-shape opening to the right of the figure. Along cross-runners 14, ceiling panels 24 meet along shorter edges 25 at butt joints 26 as shown. Conventional bugle-head self-drilling drywall screws 52 are shown for the preferred manner of affixation whereby they penetrate ceiling panels 24 and extend through the lower attachment surface 15 of cross-runner 14. In the preferred embodiment, ceiling panels 24 have staggered spacing between main-runners 11 such that butt joints 26 are created only at one side of any grid intersection. Flap 18 of cross-runner 14 connects with attachment clip 29 which in turn is supported by hanger wire 20 above. Lower attachment surfaces 12 and 15 of main-runners 11 and cross-runners 14 respectively are shown, similarly illustrated in FIG. 3, as being substantially co-planar to provide a co-planar attachment means for ceiling panels 24.

Figure 5:
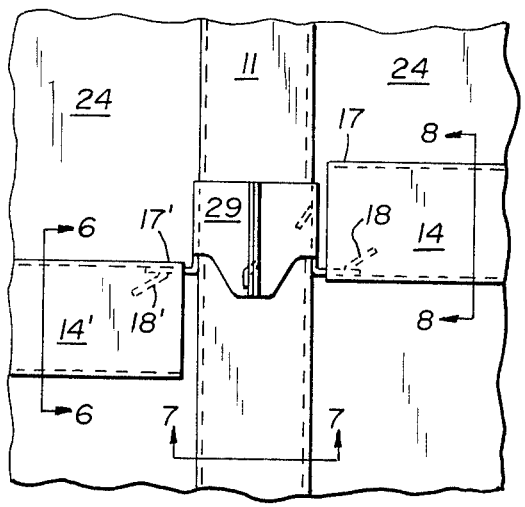
FIG. 5 is a plan view of another grid intersection point in the preferred embodiment of the invention showing cross-runners in offset horizontal alignment at a crossing with a main-runner.

FIG. 5 illustrates a typical grid intersection point for attachment system 10 having cross-runners 14 and 14' horizontally offset. This typical offset grid intersection is provided when a light assembly such as light troffer 50, shown in FIG. 1 of attachment system 10 is provided. The connection of clip 29 with main-runner 11 is substantially the same as the conventional grid intersection point shown in FIG. 2 and the connection with cross-runner 14 is substantially the same. The difference from a conventional in-line cross-runner grid intersection, shown in FIG. 2, is that cross-runner 14' is rotated 180° such that the web of the C-shape is disposed in line with the web of the C-shape of cross-runner 14 on the other side of main-runner 11. In this alignment flaps 18' of terminal end portion 17' connect with clip 29 to dispose cross-runner 14' with the opening 16' of the C-shape opposite the direction of opening 16 of the C-shape of cross-runner 14. When this offset alignment is provided at four corners of a grid as shown in attachment system 10 depicted in FIG. 1, a grid section of ceiling panels 24 is removed wherein conventional flange-type light troffer 50 is disposed simply and easily therein. Other light troffer assemblies feature a variety of support means which attach to peripheral edges of the troffer and are designed to rest atop support runners. Such support means are readily usable in this invention and may supportively rest on main-runners 11 and cross-runners 14 herein described. The construction of cross-runner 14' is identical with the construction of cross-runner 14 and its utilization at an offset grid intersection as shown in FIG. 5 only requires its being flipped over 180°. Thus it is seen that the elements for attachment system 10 are usable in a variety of ways to provide variable assembly attachments without the need of specialized component clips, extra elements, or the like. It is desirable that when a light assembly exceeds 4 feet in length, it be placed parallel to main-runners 11 in that the preferred spacing of main-runners 11 is four feet center-to-center and thereby limits a light assembly length. In this alternative alignment, wherein a light assembly is disposed parallel with main-runners 11, conventional channel-shaped fixture runners, having substantially the same cross-section as cross-runners 14, may be disposed parallel to and between adjacent main-runners 10 for support of a light assembly, and wherein the fixture runners would intersect cross-runners 14 between grid intersection points and be attached thereto with attachment clips 29 in a similar manner to the typical grid intersection shown in FIG. 2, but of course only at one side of a cross-runner 14 since a "T" intersection would be created.

Figure 6:
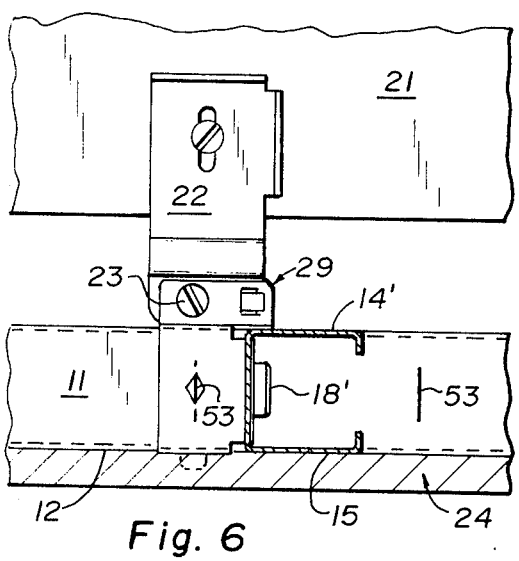
FIG. 6 is a cross-sectional view taken along line 6—6 of FIG. 5 looking in the direction of the arrows.

With reference to FIG. 6, the offset grid intersection depicted in FIG. 5 is shown in cross-section taken along line 6—6 of FIG. 5 looking in the direction of the arrows. In this figure, an alternate preferred affixation, from that of FIG. 1 for attachment clip 29, is shown. An adjustable clip 22 depends from upper joist 21 rather than hanger wire 20 attached to upper framing 19. Adjustable clip 22 and upper joist 21 are not depicted in FIG. 5 in order to more clearly show the grid intersection in that view. By means of conventional screw fasteners 23, adjustable clip 22 supports attachment clip 29.

It is envisioned that utilization of adjustable clip 22 with attachment clip 29 provides additional variable alternative attachment for attachment system 10 of this invention. Such well-known types of adjustable clips provide additional leveling techniques to ensure a workmanlike job in a manner more successful than the less sophisticated use of hanger wire 20. Such examples of readily usable adjustable clips, including swivel type brackets, are illustrated and disclosed in U.S. Pat. Nos. 3,998,020 and 3,998,419. These apparatuses disclosed for use in suspended ceilings are compatible for attachment with attachment clip 29 of this present invention. Ceiling panels 24 attach to lower attachment surfaces 12 and 15 of main-runner 11 and cross-runner 14' respectively. The opening of the C-shape of cross-runner 14' is shown opening in a direction opposite that of cross-runner 14 at the other side of main-runner 11 as seen with reference to FIG. 5 and later-discribed FIG. 8. Tab 18' is shown engaged with attachment clip 29 for support thereof. In this preferred embodiment, main-runners 11 are provided with premarked lines 53 for positioning of attachment clips 29 along main-runners 11 for accurate location at intersection point attachment.

Figure 7:
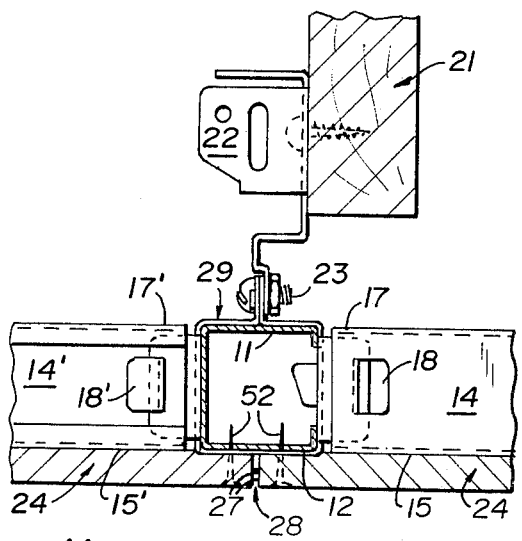
FIG. 7 is a cross-sectional view taken along line 7—7 of FIG. 5 looking in the direction of the arrows.

With reference to FIG. 7, the grid-intersection of FIG. 5 is shown in cross-section taken along line 7—7 looking in the direction of the arrows. Adjustable clip 22 is affixed to upper joist 21 (both not shown in FIG. 5) and connected by screw fastener 23 to attachment clip 29 supported below. Terminal end portions 17 and 17' of cross-runners 14 and 14' attach to attachment clip 29 by means of flaps 18 and 18' respectively. Below, and attached to lower attachment surfaces 12 of main-runner 11 and lower attachment surfaces 15 and 15' of cross-runners 14 and 14', are ceiling panels 24. Along main-runners 11, as previously disclosed herein, ceiling panels 24 meet along longer edges 27 but are spaced apart by later-discussed spacer key 49 to form open joint 28 thereby. Along main-runners 11 and cross-runners 14, ceiling panels 24 are affixed by conventionally known bugle-head drywall screws 52 which are self-drilling for attachment by penetration through lower attachment surface 12 of main-runner 11 and lower attachment surface 15 of cross-runners 14.

Figure 8:
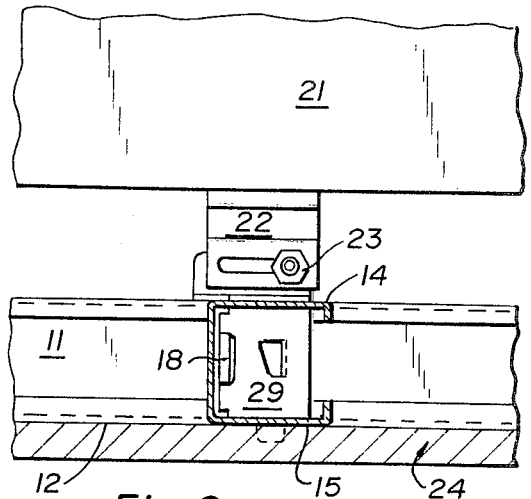
FIG. 8 is a cross-sectional view taken along line 8—8 of FIG. 5 looking in the direction of the arrows.

FIG. 8 is a cross-sectional view of FIG. 5 taken along line 8—8 looking in the direction of the arrows. This cross-section shows the side of the offset grid intersection of FIG. 5 opposite the side depicted at FIG. 6. Cross-runner 14 has the opening of the C-shape in the direction opposite the opening of cross-runner 14' at the other side of the grid intersection point. Ceiling panels 24 are again shown having attachment to the lower attachment surfaces 12 and 15 of main-runner 11 and cross-runner 14 respectively. The intersection shown in FIG. 5 is not illustrated with a butt joint location such as butt joint 28 viewed in FIGS. 2 and 4. Flap 18 of cross-runner 14 is shown engaged with attachment clip 29 for support thereto. Clip 29 is attached to adjustable clip 22 by said screw fastener 23. Upper joist 21 has adjustable clip 22 connected with and dependent therefrom.

The horizontally offset intersection shown in FIGS. 5-8 illustrates an alternate alignment, for attachment system 10 shown in FIG. 1, wherein main runner 11 is attached parallel with an upper joist 21. This is a preferred alternative embodiment and it is equally suitable for main-runners 11 to extend transverse to upper joist members such as shown in FIG. 1. When using adjustable clips, main-runners 11 could equally be disposed transverse to upper joists and thus, with reference to FIG. 7, attachment of adjustable clip 22 would be along an attachment flange which is shown disposed 90° to the attachment shown in FIG. 7 to upper joist 21. Thus in an alignment where main-runners 11 are transverse to upper joist 21, the connection with attachment clip 29 would be identical, and the only difference would be the manner of affixation of the adjustable clip 22 with the upper joist 21. Other adjustable clips well known to the construction industry are equally usable with attachment clip 22, and such are equally envisioned within the scope of this invention for use herein whether positioning main-runners parallel or transverse to upper framing members.

With more specific reference to attachment clip 29, FIGS. 9, 10, 11, and 12 are provided for more detailed illustration. Looking at FIG. 9, an end view of attachment clip 29 is shown. The view, in phantom, illustrates the separation of attachment clip 29 for connection around main-runners 11 and also shows the engaged, or closed, configuration upon such main-runner attachment. Attachment clip 29 has a generally box-like configuration 30 which comprises side walls 31 being vertically disposed in parallel planar alignment. Lower wall 36 opposes upper wall 37 in parallel planar horizontal alignment to complete the generally box-like configuration 30.

Figure 9:
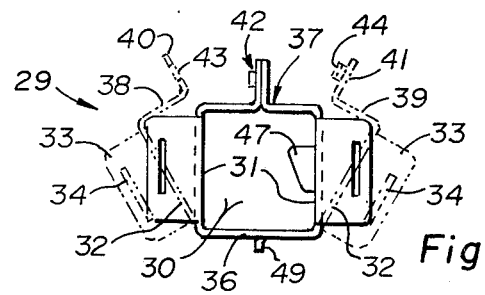
FIG. 9 is an end view of the attachment clip for the attachment system in accordance with this invention illustrating in phantom the separation of the clip for attachment around outer portions of a main-runner.
Figure 10:
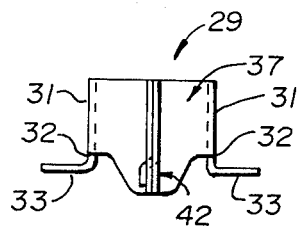
FIG. 10 is a top view of the attachment clip as shown in FIG. 9.

Upper wall 37 separates generally centrally along a line which extends generally longitudinal of the attachment clip 29, and being longitudinal of a main-runner 11 alignment, as best seen in FIGS. 9 and 10 conjunctively. Half 38 of upper wall 37 and half 39 of upper wall 37 are thereby created. Extending upwardly from the separation edge of halves 38 and 39 are upwardly extending tabs 40 and 41 respectively. Upwardly extending tabs 40 and 41 preferably extend the full length of the separation edge of halves 38 and 39 but may be suitably provided for less than the full length of the separation. Upon closure around a main-runner 11, tab connecting means 42 attaches tab 40 and 41. Tab connecting means 42 comprises slot 43 extending through tab 40 and struck-out projection 44 extending sideward from tab 41. Thus, as seen in the solid-line closed configuration of FIG. 9, struck-out projection 44 extends through slot 43 which connects tabs 40 and 41. The struck-out projection 44 is bent after insertion within slot 43 and affords releasable connection if removal of attachment clip 29 is required. The process of separating attachment clip 29 is simply reversed. Being of light-gauge sheet-steel, a resilient separation of attachment clip 29 is readily attained. It is envisioned that attachment clip 29 comprises an integral one-piece construction, as clearly shown in FIGS. 9–11, and be composed of light-gauge sheet-steel having a thickness in a range of from about 0.018 inches, 26 gauge, to about 0.048 inches, 18 gauge.

The manner of attachment with cross-runners 14 and 14' is best illustrated with reference again to FIGS. 9 and 10 together. Side walls 31 have vertical edges 32 at the same side of attachment clip 29. Extending outwardly, at generally 90° to side walls 31 from vertical edges 32, are attachment flanges 33. Attachment flanges 33 are provided with slots 34 for affixation of flaps 18 in terminal end portions 17 of cross-runners 14. With additional reference to FIG. 11, it is seen that notches 35 are provided wherein attachment flanges 33 do not connect along the full vertical extent of vertical edge 32 and create notches 35. In an alternate embodiment attachment flanges 33 extend from the full vertical extent of vertical edge 32. In another alternative, attachment flanges 33 have notches 35 and do not connect along the full vertical extent of vertical edge 32 but have remaining flange portions with a vertical dimension the same or longer than vertical edge 32. It is envisioned, that the attachment of attachment clip 29 is made by attachment flanges 33 extending inside the channel of the generally C-shape of cross-runners 14 and thus flaps 18 project inwardly of the web of the C-shape into slot 34. The height of attachment flanges 33 are provided, in the illustrated embodiment, to extend for substantially the full interior vertical dimension of the channel-shape of cross-runners 14. It is desirable that the exterior vertical height of cross-runners 14 and main-runners 11 be provided in the range of from about 1¼ inches to about 2¾ inches and thereby the height of attachment flanges 33 would be accordingly determined for connective compatability within the channel-shape and thus would be correspondingly manufactured in compatible sizes. In the preferred embodiment, the C-shapes of both main-runners 11 and cross-runners 14 are provided wherein the exterior height of the C-shape is 1⅝ inches.

Figure 11:
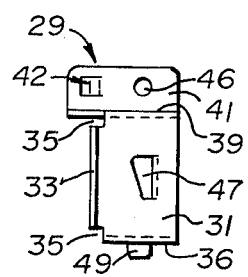
FIG. 11 is a right side view of the attachment clip as shown in FIG. 9.

With respect to FIG. 11, the right side view of attachment clip 29 is illustrated. Upwardly extending tab 41 is shown in side view and provided with an aperture 46 for attachment of hanger wire 29 or attachment with adjustable clip 22 by means of screw fasteners 23. Other shapes of aperture 46 may be provided as particular clips and supportive components may be used in the industry for attachment to framing and joists. Side wall 31 has alignment tongue 47 struck out therefrom. As seen in conjunction with FIG. 9, alignment tongue 47 extends inwardly of the box-like configuration 30. Alignment tongue 47 is provided for ease of installation whereby an installer is led to consistently position attachment clips 29 in the same alignment along main-runners. Since the preferred embodiment envisions main-runners 11 having their C-shaped openings in the same direction and since alignment tongue 47 extends inward of the box-like configuration 30, attachment to a main-runner 11 in the wrong direction would be precluded because alignment tongue 47 must be able to extend into opening 13 of a main-runner and thus attachment is required in a single clip orientation throughout. This ensures correct grid spacing for panel attachment. In this configuration, alignment tongue 47 thereby positions attachment flanges 33 of a series of attachment clips 29 with the same direction such that at cross-runner 14 grid intersections attachment to the flaps 18 is made in the same orientation and panel spacing is ensured.

Extending from lower wall 36 is spacer key 49. With particular reference to FIGS. 3, 7, and 9 it is seen that spacer key 49 is provided between the longitudinal edges 27 of ceiling panels 24 thereby providing an open joint 28. The spacer key 49 allows positive alignment throughout attachment system 10 by aiding the installer in locating the longitudinal edge 27 with reference to main-runners 11 for attachment thereto. Additionally, it has been found that open joint 28 allows ready application of typical joint adhesive compounds widely known to the gypsum ceiling panel construction industry. The spacing also exhibits excellent fire resistant expansion and contraction behavior during exposure to fire testing procedures. Spacer key 49 is desirably constructed having a vertical dimension of from about ⅛ inch to about ¾ inches for use with the desirable range of ceiling panel thicknesses herein disclosed.

Figure 12:
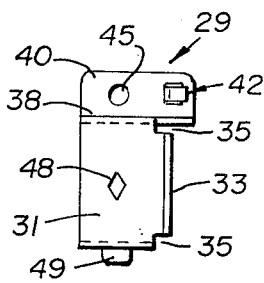
FIG. 12 is a left side view of the attachment clip as shown in FIG. 9.

Turning now to FIG. 12, the left side view of attachment clip 29 is shown. In this view, upward extending tab 40 is shown and has aperture 45 in alignment with aperture 46 of upward extending tab 41 for attachment with hangar wires, clips, attachment components, and other widely known supportive engagement artifices for attachment to upper framing or joists. At this side of attachment clip 29, positioning slot 48 is shown punched out from side wall 31 at this side of the attachment clip. With reference to FIG. 6, it is seen that premarked lines 53 may be initially scored, or painted, or main-runners 11 at desired grid intersection, or other, attachment points. Positioning slot 48 thus provides positive alignment along main-runners 11 by locating the positioning slot 48 over premarked lines 53 or other similar markings that would satisfy this purpose. In the preferred embodiment, seen in FIG. 12, positioning slot 48 resides in a vertical plane with aperture 45 and 46, such that the alignment with a premarked line 53 would place the attachment apertures 45 and 46 also in a vertical plane with said premarked lines 53. Such is desirable, but however, positioning slot 48 need not be in a vertical alignment with apertures 45 and 46, and accordingly offset premarked lines 53 may be used as would be well understood by one skilled in the art.

As illustrated in FIGS. 1–12 and as disclosed herein, it is thus seen that the unique attachment system for suspended drywall ceiling panels provides simplified components wherein main-runners and cross-runners have generally substantially the same shape and attachment clips are easily installed along main-runners for attachment with conventional components to upper framing members. The attachment clip of this novel attachment system additionally provides alignment and positioning properties which simplifies installation and can be provided with no abnormal manufacturing stamping techniques for light-gauge sheet steel.

The attachment system also provides desirable fire resistant qualities. During test exposure to the time and temperature conditions specified by the Standard Fire Tests of Building Construction Materials pursuant to the American Society of Testing and Materials Test Number E-119, the temperatures on the supporting joists and unexposed surfaces stayed below the limits. A ceiling system made according to the invention, performed extremely well during a three-hour test. The test was provided utilizing a ⅝ inch thick gypsum ceiling panel having fire resistant properties wherein additives such as vermiculite and glass fiber are utilized to provide the fire resistancy such as disclosed in U.S. Pat. No. 3,454,456. Pursuant to these testing conditions, ceiling panels remained in place for three hours and joints between panels had only opened slightly. During the cooling period after the test procedure there was no evidence of deleterious distortion or buckling. It is envisioned within the scope of this invention that other thicknesses of gypsum ceiling panels may be used and that depending on the fire resistancy demanded by particular construction requirements, fire resistant ceiling panels may or may not be utilized within the scope of this invention. As aforementioned, a double layer of gypsum ceiling panels may be laminated to provide additional thicknesses for additional fire resistancy, sound insulation or heat insulation as needed.

Previously discussed light troffer 50 is representative of conventional flange-type light assemblies that are positioned within suspended ceiling systems. Alternatively they may be provided to extend below the ceiling surface, flush with the ceiling surface, or recessed. Generally, the conventional light troffer assemblies have support means which engage adjacent cross and main-runner members. The instant invention allows attachment of these well-known flange-type light troffer assemblies without the need of special clip components whereby conventional support means, shown as bracket assembly 51, may engage directly the cross-runners and main-runners of this inventive attachment system.

Thus it is apparent that there has been provided, in accordance with the invention, an attachment system for suspended drywall ceiling panels that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An attachment system for suspended drywall ceiling panels comprising:
   a panel support grid, said grid having a series of main-runers and cross-runners disposed with lower panel attachment surfaces in generally co-planar relationship wherein cross-runners extend between main-runners in lengths defined by main-runner spacing intervals, said grid having intersection points at main-runner and cross-runner crossings;
   attachment clips positioned at said intersection points interconnecting cross-runners and main-runners, said attachment clips being integrally constructed from light-gauge steel and having a box-like configuration with two opposing vertical walls and opposing upper and lower horizontal walls wherein the upper wall centrally separates into halves along a line parallel to said main-runner, said halves include upwardly extending tabs with tab connecting means releasably connecting both halves of said upper wall, said tabs having apertures therethrough facilitating attachment to upper support means, said opposing vertical walls each having an oppositely extending cross-runner attachment flange extending from vertical edges at the same side of the clip, said attachment flanges connecting cross-runners at opposite sides of said main-runner, whereby said clip is engaged in a sleeve-like manner to said main-runner by means of said box-like configuration separating at said upper wall to extend around outer portions of the main-runner, said clip further having an alignment tongue struck out from one opposing side wall extending inwardly of said box-like configuration and a positioning slot at the side wall opposing the alignment tongue, a centrally located panel spacer key struck out from the lower wall extending downwardly in a plane generally parallel with the longitudinal axis of the main-runner; and,
   ceiling panels comprised of gypsum and being mechanically fastened to said panel attachment surfaces, wherein adjacent panels meet at butt joints along cross-runners and spaced-apart at open joints along said main-runners by said spacer keys of said attachment clips.

2. An attachment system for suspended drywall ceiling panels as claimed in claim 1 wherein the cross-runner attachment flanges are slotted and the cross-runners have positionally corresponding struck-out flaps which engage the slots of the flange for connective attachment.

3. An attachment system for suspended drywall ceiling panels as claimed in claim 1 wherein a plurality of intersection points comprise cross-runners having offset horizontal alignment.

4. An attachment system for suspended drywall ceiling panels as claimed in claim 1 wherein said upper support means is vertically adjustable to provide level planar alignment for said ceiling panels.

5. An attachment system for suspended drywall ceiling panels as claimed in claim 1 wherein said ceiling panels are affixed to said main-runners and cross-runners by means of self-drilling screw fasteners.

6. An attachment system for suspended drywall ceiling panels as claimed in claim 1 wherein connection of attachment clips to upper support means is provided at less than all of the intersection points.

7. An attachment system for suspended drywall ceiling panels as claimed in claim 6 wherein connection of attachment clips to upper support means is provided at alternate intersection points in a direction along said main-runners.

8. An attachment system for suspended drywall ceiling panels as claimed in claim 1 wherein main-runners and cross-runners comprise channels having a generally C-shape with the opening of the C opening sidewardly whereby said C-shaped main-runners open in the same direction and said C-shaped cross-runners open in the same direction.

9. An attachment system for suspended drywall ceiling panels as claimed in claim 8 wherein the alignment tongue of the attachment clip extends into the C-shaped main-runners.

10. An attachment system for suspended drywall ceiling panels as claimed in claim 1 wherein the gypsum ceiling panels have a thickness in the range of from about ⅜ inch to about 1 inch and are rectangular having dimensions in the range of from about two feet wide to four feet wide and length in the range of about four feet long to about twelve feet long, said panels are attached to said runners with longer sides parallel to main-runners and shorter sides parallel to cross-runners.

11. An attachment system for drywall ceiling panels as claimed in claim 1 wherein main-runners are spaced apart at intervals of from about two feet to about four feet center-to-center and cross-runners are spaced apart at intervals of from about two feet to about four feet center-to-center.

12. An attachment system for suspended drywall ceiling panels as claimed in claim 1 wherein the main-runners are marked at spaced-apart intervals corresponding with intersection points for locating the positioning slot of said clip to thereby provide correct positioning of said clips along said main runners.

13. An attachment system for suspended drywall ceiling panels as claimed in claim 1 wherein ceiling panels are removed in at least one area bounded by two cross-runners and two main-runners and a conventional flange-type light troffer is disposed over said area and is supported along peripheral flanges by said bounding runners.

14. An attachment clip for interconnecting C-shaped cross-runner channels to C-shaped main-runner channels at grid intersection points in a suspended drywall ceiling panel system, said clip comprises integral one-piece construction of light-gauge sheet-steel having a thickness in the range of from about 0.018 inches (26 gauge) to about 0.048 (18 gauge), said clip having:

a box-like configuration with two opposing vertical walls and opposing upper and lower horizontal walls, the upper wall centrally separates into halves aiong a line generally parallel to the planes of the vertical walls, said halves including upwardly extending tabs with releasably connecting means connecting both halves, said tabs having apertures therethrough facilitating attachment to upper support means, said opposing vertical walls each having an oppositely extending cross-runner attachment flange extending from vertical edges at the same side of the clip, said flanges adapted to connect cross-runners at opposite sides of a main-runner, said clip is adapted to resiliently separate along said central separation line of said upper wall and thereby fit around a main-runner for a sleeve-like attachment thereto by closing around said main-runner disposed within the box-like configuration and said upwardly extending tabs adapted to releasably connect both halves of said upper wall at said tab connecting means after attachment to said main-runner;

an alignment tongue struck out from one opposing side wall extending inwardly of said box-like configuration extention into the opening of the C-shape of said main-runner;

a positioning slot at the side wall opposite said alignment tongue, said positioning slot adapted to provide locating means for proper positioning of the clip along main-runners at corresponding marked clip locations on said main-runner; and, a centrally located spacer key struck out from said lower wall extending downwardly substantially coplanar with the imaginary vertical plane passing through the line of separation of said upper wall, said spacer key adapted to provide a spaced-open joint between adjacent ceiling panel edges below and along main-runners.

15. An attachment clip as claimed in claim 14 wherein the releasably connecting tab means comprises a slot on one tab and a corresponding struck-out projection on the other tab adaptable for insertion through said slot upon said sleeve-like attachment of the clip around a main-runner.

16. An attachment clip as claimed in claim 14 wherein the apertures of the releasably connecting tab means are adapted for mechanical affixation with upper support means by screw fasteners.

17. An attachment clip as claimed in claim 14 wherein the apertures of the releasably connecting tab means are adapted for mechanical affixation with upper support means by hanger wires.

18. An attachment clip as claimed in claim 14 wherein the cross-runner attachment flanges have at least one slot for insertion of struck-out flap portions on termini of cross-runners whereby cross-runners are connected by said clip and supported by main-runners.

19. An attachment clip as claimed in claim 14 wherein the spacer key extends downwardly at a distance of from about ⅛ inch to about ¾ inches.

20. An attachment clip as claimed in claim 14 wherein the cross-runner attachment flanges extend from along less than the full height of the vertical edge of said side walls.

21. An attachment clip as claimed in claim 20 wherein the cross-runner attachment flanges are notched at the side wall vertical edge and remaining portions of the ahachment flanges are of substantially the same height as the box-like configuration and are adapted to extend inside the channel of C-shaped cross-runners.

22. An attachment clip as claimed in claim 21 wherein the slots of the cross-runner attachment flanges are adapted for receiving struck-out flap portions of C-shaped cross-runners which are struck out inwardly of the C-shaped channel for engagement to said attachment flanges within said channel of the C-shape.

23. An attachment clip as claimed in claim 14 wherein the upwardly extending tabs of the upper wall extend for less than the full length of the separation line.

* * * * *